(12) United States Patent
Zhu et al.

(10) Patent No.: US 12,611,778 B2
(45) Date of Patent: Apr. 28, 2026

(54) ROBOT TELEOPERATION METHOD, ROBOT AND STORAGE MEDIUM

(71) Applicants: SHANGHAI FLEXIV ROBOTICS TECHNOLOGY CO., LTD., Shanghai (CN); FLEXIV LTD., Grand Cayman (GB)

(72) Inventors: Peizhang Zhu, Shanghai (CN); Yunze Shi, Shanghai (CN); Zhan Fan Quek, Singapore (SG); Xiyang Yeh, Santa Clara, CA (US); Wanxi Liu, Shanghai (CN)

(73) Assignees: SHANGHAI FLEXIV ROBOTICS TECHNOLOGY CO., LTD., Shanghai (CN); FLEXIV LTD., Crand Cayman (GB)

( * ) Notice: Subject to any disclaimer, the term of this patent is extended or adjusted under 35 U.S.C. 154(b) by 373 days.

(21) Appl. No.: 18/144,377

(22) Filed: May 8, 2023

(65) Prior Publication Data

US 2024/0025049 A1 Jan. 25, 2024

Related U.S. Application Data

(63) Continuation-in-part of application No. PCT/CN2022/107662, filed on Jul. 25, 2022.

(51) Int. Cl.
*B25J 9/00* (2006.01)
*B25J 9/16* (2006.01)
(52) U.S. Cl.
CPC .......... *B25J 9/1689* (2013.01); *B25J 9/1697* (2013.01)
(58) Field of Classification Search
None
See application file for complete search history.

(56) References Cited

U.S. PATENT DOCUMENTS 10,377,043 B2 * 8/2019 Takeuchi ............... B25J 9/1633
2006/0038813 A1 2/2006 Dohta
(Continued)

FOREIGN PATENT DOCUMENTS

CN 105242533 A 1/2016
CN 106625661 A 5/2017
(Continued)

OTHER PUBLICATIONS

International Search Report and Written Opinion for International Application No. PCT/CN2022/107662 mailed Apr. 7, 2023.
Lin et al. "Virtual Fixture Assisted Haptic Interaction Research Based on Real-Time Point Cloud Modeling" Computer Engineering and Design, vol. 36, No. 2. doi: 10.16208/j.issn1000-7024.2015.02.040. Feb. 2015. pp. 492-497.
(Continued)

*Primary Examiner* — Truc M Do
(74) *Attorney, Agent, or Firm* — Ballard Spahr LLP

(57) ABSTRACT

A robot teleoperation method, a robot and a storage medium are disclosed. The method includes: acquiring an image of a target object, and generating a point cloud of the target object according to the image; establishing a virtual fixture based on a geometric feature corresponding to the point cloud; the virtual fixture including at least one of a forbidden region virtual fixture or a guidance virtual fixture; determining a reference point of the virtual fixture and a control point of the robot, and determining a virtual force of the virtual fixture acting on the control point according to a distance between the reference point and the control point; and determining a control force applied to the control point based on the virtual force.

18 Claims, 6 Drawing Sheets

(56) References Cited

U.S. PATENT DOCUMENTS

| | | | | |
|---|---|---|---|---|
| 2014/0168073 A1* | 6/2014 | Chizeck | ................ | G06T 15/405 |
| | | | | 345/156 |
| 2014/0320629 A1* | 10/2014 | Chizeck | ................. | G06T 15/04 |
| | | | | 348/81 |
| 2017/0106537 A1* | 4/2017 | Chizeck | ................ | B25J 9/1689 |
| 2018/0232052 A1* | 8/2018 | Chizeck | ................. | G06F 3/016 |
| 2021/0370507 A1* | 12/2021 | Corcodel | .............. | B25J 9/1633 |

FOREIGN PATENT DOCUMENTS

| | | | |
|---|---|---|---|
| CN | 110992777 A | 4/2020 |
| CN | 111660307 A | 9/2020 |
| CN | 112091974 A | 12/2020 |
| CN | 113386142 A | 9/2021 |
| CN | 113977585 A | 1/2022 |
| CN | 114131616 A | 3/2022 |
| DE | 102019134665 B3 | 12/2020 |
| JP | 2012011498 A | 1/2012 |
| JP | 2020163511 A | 10/2020 |
| WO | 2019148178 A1 | 8/2019 |

OTHER PUBLICATIONS

Ni et al. "Local Implicit Surface Based Virtual Fixtures in Point Cloud Virtual Environment for Teleoperation" 2016 Tenth International Conference on Sensing Technology.doi: 10.1109/ICSENST. 2016.7796325. Nov. 11, 2016. pp 1-6.

Xu et al. "Visual-Haptic Aid Teleoperation Based on 3-D Environment Modeling and Updating" IEEE Transactions on Industrial Electronics, vol. 63, No. 10, Oct. 1, 2016. doi: 10.1109/TIE.2016. 2578239. pp 6419-6428.

Arora et al. "Mobile Manipulator Robot Visual Servoing and Guidance for Dynamic Target Grasping" https://doi.org/10.1007/ 978-3-030-64559-5_17. Nov. 11, 2016. pp. 223-235.

Zainan et al. "Research on flexible virtual fixture enhanced by vision for teleoperation modeling" Journal of Huazhong University of Science and Technology (Natural Science Edition). Dec. 23, 2011. pp. 73-76.

Extended European Search Report for European Application No. 22952200.8 mailed Sep. 2, 2025.

Office Action for Chinese Application No. 202210880112.5 mailed Jun. 13, 2025.

* cited by examiner

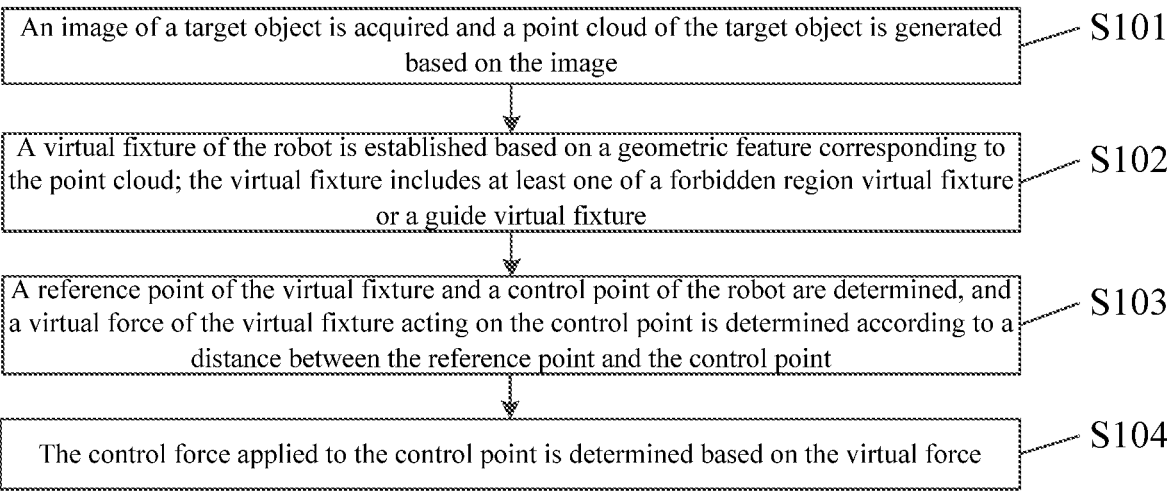

| An image of a target object is acquired and a point cloud of the target object is generated based on the image | — S101 |

| A virtual fixture of the robot is established based on a geometric feature corresponding to the point cloud; the virtual fixture includes at least one of a forbidden region virtual fixture or a guide virtual fixture | — S102 |

| A reference point of the virtual fixture and a control point of the robot are determined, and a virtual force of the virtual fixture acting on the control point is determined according to a distance between the reference point and the control point | — S103 |

| The control force applied to the control point is determined based on the virtual force | — S104 |

FIG. 1

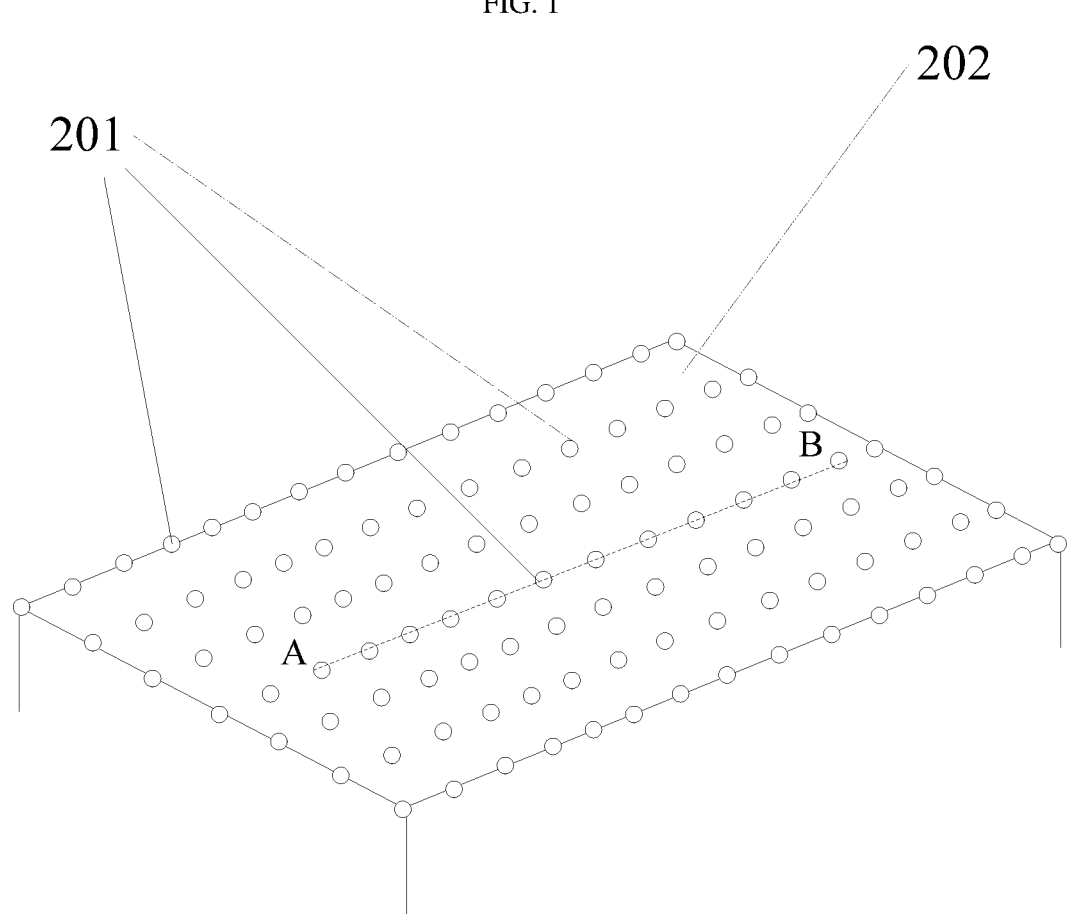

ROBOT TELEOPERATION METHOD, ROBOT AND STORAGE MEDIUM

CROSS-REFERENCE TO RELATED APPLICATION

This application is a continuation-in-part application of PCT International Application No. PCT/CN2022/107662, filed on Jul. 25, 2022, the contents of which is incorporated herein by reference in its entirety.

TECHNICAL FIELD

The present disclosure relates to the field of robot teleoperation technology, and particularly to a robot teleoperation method, a robot and a storage medium.

BACKGROUND

The robot teleoperation technology is widely used in telemedicine, remote service, remote grasping, space exploration and other fields. Compared to a robot control technology, a teleoperation system can build realistic and reliable human-robot interaction scenarios, which enables an operator to control an off-site robot in real time in a natural and controllable way to accomplish various tasks. However, in the case that a workspace environment is complex and changing, there is still room for the improvement of the conventional robot teleoperation technology in terms of the accuracy, stability and security properties.

SUMMARY

According to a first aspect of the present disclosure, some embodiments provide a teleoperation method for a robot, including: acquiring an image of a target object, and generating a point cloud of the target object according to the image; establishing a virtual fixture based on a geometric feature corresponding to the point cloud; the virtual fixture including at least one of a forbidden region virtual fixture or a guidance virtual fixture; determining a reference point of the virtual fixture and a control point of the robot, and determining a virtual force of the virtual fixture acting on the control point according to a distance between the reference point and the control point; and determining a control force applied to the control point based on the virtual force.

According to a second aspect of the present disclosure, some embodiments further provide a robot including a memory and a processor. The memory is configured to store a computer program. The processor is configured to perform the above method when the processor executes the computer program.

According to a third aspect of the present disclosure, some embodiments further provide a non-transitory computer-readable storage medium storing a computer program thereon. When the computer program is executed by a processor, the processor is caused to perform the above method.

The details of one or more embodiments of the present disclosure are set forth in the accompanying drawings and the description below. Other features, objects and advantages of the present disclosure will become apparent from the description, drawings and claims.

BRIEF DESCRIPTION OF THE DRAWINGS

In order to illustrate technical solutions of the embodiments of the present disclosure more clearly, the following briefly introduces the accompanying drawings used in the description of the embodiments. The accompanying drawings in the following description are merely some exemplary embodiments of the present disclosure, but shall not be construed as a limitation to the scope of the present disclosure.

FIG. 1 illustrates a schematic flowchart of a robot teleoperation method according to some embodiments of the present disclosure.

FIG. 2 illustrates a schematic diagram of a virtual fixture according to an embodiment of the present disclosure.

DETAILED DESCRIPTION

Figure 3:
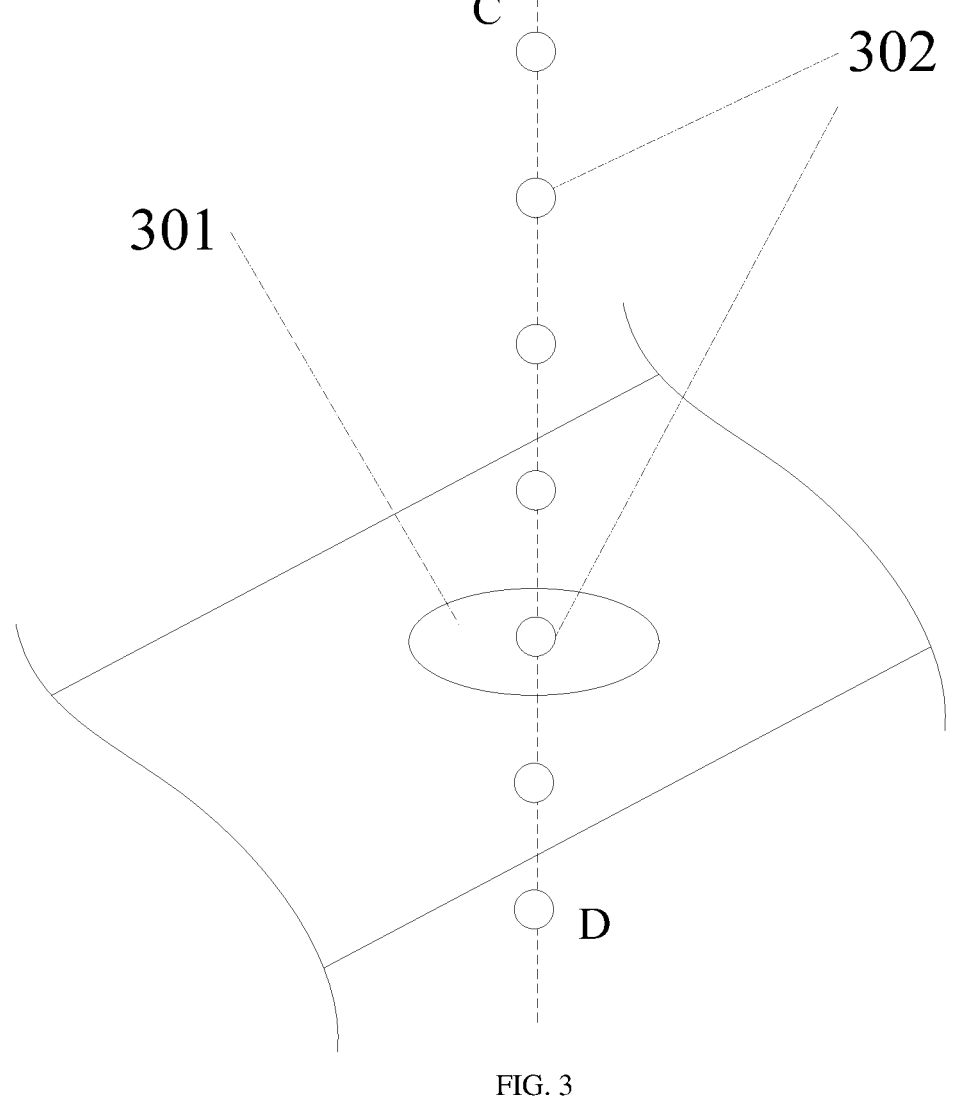
FIG. 3 illustrates a schematic diagram of a virtual fixture according to another embodiment of the present disclosure.

In order to make the objects, features and advantages of the present disclosure more clearly understood, the specific embodiments of the present disclosure are described in detail below with reference to the accompanying drawings. In the following description, numerous specific details are set forth to provide thorough understanding of the present disclosure. However, the present disclosure may be implemented in many ways different from those described herein, and those skilled in the art may make similar improvements without violating the connotation of the present disclosure. Therefore, the present disclosure is not limited to the specific embodiments disclosed below.

The flowcharts used in this specification illustrate operations implemented by the system according to some embodiments in this specification. It should be clearly understood that the operations of the flowcharts may be implemented in other orders. Instead, the operations may be implemented in reverse order or simultaneously. In addition, one or more other operations may be added to the flowchart. One or more operations may be removed from the flowchart.

For ease of description, the following terms that appear in the specification will be explained as below.

A virtual fixture, also known as virtual guidance or virtual constraint, is an algorithm implemented by a robot controller to simulate a physical fixture placed in the robot's actual workspace. For a forbidden region virtual fixture, in response to the robot's end-effector trying to cross the virtual fixture, a reaction force is generated by the virtual fixture and transmitted to the robot controller. The reaction force may keep the robot's end-effector from crossing the virtual fixture and the robot's end effector may act as if hitting a real obstacle. For a guidance virtual fixture, in response to the robot's end-effector trying to deviate from a preset trajectory, a reaction force is generated by the virtual fixture and transmitted to the robot controller. The reaction force may constrain and guide the robot's end-effector to continue move along the preset trajectory. Herein, the virtual fixture may be of any shape, and is usually designed based on actual environments, to better adapt to the actual application.

A point cloud is a collection of data points in a three-dimensional (3D) plane with each data point having a set 3D coordinate on the X, Y, and Z axis. When the data points are aggregated together, they may be used to create a 3D map or model. For example, if the data compiled to create the point cloud is taken from a neighborhood, the created point cloud may show a location of each building, tree, and power line, along with its elevation relative to the ground. The collected point cloud data and a density of the point cloud can reflect details and specific types of terrain and structures of the environment. In an example, the data points of the point cloud may also include color information or reflection intensity information.

There may be several kinds of implementations of the robot teleoperation technology.

The first implementation is a robot teleoperation without force (haptic) feedback. A robot teleoperation system corresponding to this technology includes a master device and a slave device. In most cases, the slave device may be a robot arm, and the master device may be another robot arm or a dedicated device. In this technology, the slave device may try to follow a position and a velocity of the master device, while no force feedback from the slave device is rendered on the master device.

The second implementation is a robot teleoperation with force (haptic) feedback. Such technology includes all above items from the first implementation, plus force/torque sensing capability of the slave device, and the sensed force/torque at the slave device is further transmitted as a feedback information to the master device. The feedback information will then render using an actuation system of the master device, so that an operator can feel such force feedback.

The third implementation is a robot teleoperation including all items from the second implementation and further including a virtual fixture. The virtual fixture has a predefined and fixed shape to assist an operator in performing teleoperation tasks.

The inventors found that the first and second implementations of robot teleoperation technologies mainly rely on the operator to properly execute the task with full-manual control. In most cases, teleoperation tasks contain portions where the robot can already do a fast and good job autonomously without human interference, thus the overall task efficiency of the teleoperation tasks is not optimized. Further, when the robot teleoperation is performed with bad network connection or external interference, the network latency and external interference may cause a mismatch between human intention at the master side and actual execution at the slave side, which would affect the security performance of the robot control. For example, when a fragile workpiece is manipulated by the slave device or the workspace of the slave device is very constrained, one may be difficult to ensure the safety of the slave operation, as well as the reliability of the entire system. In addition, the operator is flexible and intelligent, but lacks the high accuracy of a robot, so that a full manual teleoperation may not meet high precision and quality requirements of certain tasks.

The third implementation of the robot teleoperation technology is based on the virtual fixture to realize human-robot interaction. The virtual fixture may overcome some of the limitations found in the full-manual teleoperation, but a location of the virtual fixture needs to be set in advance and cannot be updated in real time. Thus, such robot teleoperation technology may be limited to a few usage cases where updating the location of the virtual fixture is not needed, e.g., a case where a repeated operation is needed. In addition, since a shape of the virtual fixture is pre-configured, the virtual fixture cannot be applied and adapted in real time to tasks which require the shape of the virtual fixture to be able to change according to the current condition of the environment, e.g., tasks related to dealing with soft surfaces. As a result, such robot teleoperation technology is not conducive to improving security performance and operating performance.

In other words, the virtual fixture in the above technical solution is typically task-dependent and is pre-defined by humans in a known working environment. The conventional virtual fixture cannot reflect updated environmental condition in real time according to changing environments, and has difficulty in adapting to a changing or unstructured environment in a timely manner.

In view of this, some embodiments of the present disclosure provide a robot teleoperation method, which is capable of acquiring an image of a target object in real time, generating a point cloud of the target object according to the image, and establishing a virtual fixture in real time based on a geometric feature corresponding to the point cloud, so that the robot teleoperation can adapt to a changing or unstructured environment in time. In other words, according to the embodiments, the robot teleoperation method can overcome the technical defect that a conventional pre-defined virtual fixture can only be applied to a constructed and fixed working environment. In addition, in the embodiments of the present disclosure, the virtual fixture established in real time can handle and adapt to environments with an irregular or changing geometry, thereby overcoming the technical limitation that a conventional virtual fixture can only be constructed to have a fixed shape.

FIG. 1 illustrates a schematic flowchart of a teleoperation method of a robot according to some embodiments of the present disclosure, and the method includes the following steps S101 to S104.

At Step S101, an image of a target object is acquired and a point cloud of the target object is generated based on the image.

In some embodiments, a vision device may be used to acquire image data and/or depth data of the target object in real time at a preset sampling frequency, for generating a point cloud of the target object based on the image data and/or the depth data. A manner of generating the point cloud of the target object may refer to relevant methods in a conventional image recognition technology, which will not be described herein.

The vision device may be installed on an end-effector of the robot, and configured to follow a movement of the end-effector to acquire images of the target object in real time. The vision device may also be a fixed device relative to the target object, and configured to acquire images of the target object in real time.

The vision device may be a three-dimensional (3D) camera or a depth camera configured to acquire image data and depth data of the target object. The vision device may also be a 3D laser scanner configured to generate a point cloud of the target object by performing a point cloud data acquisition on the target object. A process of acquiring 3D images by the vision device may be called as scanning, and may be applied to any type of an object or a surface in the environment. The vision device may scan the target object according to a specific trajectory and at a specific sampling frequency, to obtain point cloud data. Then, the point cloud data may be analyzed and processed by a dedicated software tool to generate a point cloud of the target object. During operation, the vision device may acquire images of the target object in real time to reflect an updated shape and/or a location of the target object, and the processes of acquiring images, processing data and generating the point cloud are performed continuously in a certain cycle period.

At Step S102, a virtual fixture of the robot is established based on a geometric feature corresponding to the point cloud. The virtual fixture includes at least one of a forbidden region virtual fixture or a guidance virtual fixture. The forbidden region virtual fixture indicates a forbidden region where a movement of the robot is restricted, and the guidance virtual fixture indicates an active region where the robot is guided to move along a specific trajectory.

For a discrete point cloud of a specific environment and a specific object, the point cloud of the object and a surface in the environment may indicate specific geometries. Thus, the geometrical shape(s) corresponding to the point cloud, such as a circle, a plane, a cylinder, an edge, a square, etc., may be determined by extracting the characteristics of the point cloud by using a point cloud segmentation technology based on the point cloud or the point cloud data. Subsequently, a geometric feature of the virtual fixture may be obtained based on the geometrical shape and an actual application scenario, which may be used for establishing the virtual fixture of the robot. For example, the geometric feature may be a central axis of the cylinder, a surface of the table, an edge of the workpiece, a center of the sphere, etc. Referring to FIG. 2, in an embodiment, a geometrical shape corresponding to the point cloud 201 of the target object may be determined as a plane. Then, based on this geometrical shape and the actual application scenario, a geometric feature of the virtual fixture may be determined as a surface of a table 202, which may be used for establishing a corresponding virtual fixture. Referring to FIG. 3, in another embodiment, a geometrical shape corresponding to the point cloud of the target object may be determined as a circle. Then, based on this geometrical shape and the actual application scenario, a geometric feature of the virtual fixture may be determined as a hole 301, which may be used for establishing the corresponding virtual fixture.

Types of the virtual fixture may include a forbidden region virtual fixture and a guidance virtual fixture. The type of the virtual fixture may be specified by an operator based on the geometric feature corresponding to the point cloud and the actual application scenario. Alternatively, the type of the virtual fixture may be identified based on a machine vision model or a deep learning model, and the present disclosure is not limited thereto. For example, the operator of the robot may determine in advance whether it is desired to use the forbidden region virtual fixture or the guidance virtual fixture during the operation, and input a corresponding instruction to the control system of the robot. After receiving the instruction, the robot may define the virtual fixture as the type specified by the operator during the process of establishing the virtual fixture.

Depending on the actual application scenario of the robot teleoperation, in an example, the forbidden region virtual fixture may be established, e.g., in the case that the robot performs an obstacle avoidance task in a working environment. In an example, the guidance virtual fixture may be established, e.g., in the case that a robot is guided to move to a target location along a spatial trajectory line or a spatial trajectory plane. In an example, both the forbidden region virtual fixture and the guidance virtual fixture may be established, e.g., in the case that a robot is guided to move along a spatial trajectory line or a spatial trajectory plane to a target location while an obstacle avoidance task is performed by the robot during the movement. The type and the number of virtual fixtures may be set according to actual application scenario and needs, and the present disclosure is not limited thereto.

At Step S103, a reference point of the virtual fixture and a control point of the robot are determined, and a virtual force of the virtual fixture acting on the control point is determined according to a distance between the reference point and the control point.

The control point of the robot may be selected from points of a surface of an end effector of the robot and/or a surface of a robot arm of the robot.

In some embodiments, the reference point of the virtual fixture may be selected from points of the point cloud characterizing the surface of the target object. In an example, referring to FIG. 2, an operation task of the robot is to control the end effector to travel from an initial position A to a target position B along a trajectory path (the dashed line in FIG. 2) of the surface of the target object. In this scenario, the points of the point cloud which characterize the trajectory path are selected as the reference points of the guidance virtual fixture. In another example, the operation task of the robot is to control the end effector to avoid an obstacle within the work environment, points of the point cloud characterizing a surface of the obstacle object are selected as reference points of the forbidden region virtual fixture.

In some embodiments, reference points may be constructed based on a geometric feature, and a distribution of the reference points may correspond to a desired motion path or a desired obstacle avoidance path of the control point(s). In an example, referring to FIG. 3, an operation task of the robot is to control the end effector to grasp a workpiece and to travel from an initial position C to a target position D through a hole 301 (e.g., an insertion operation). In this example, the reference points 302 guiding the virtual fixture are constructed based on the geometric feature corresponding to the point cloud characterizing the hole, i.e., based on a central axis of the hole, with the distribution of the reference points corresponding to the central axis of the hole, so as to control the end effector to travel from the initial position C to the target position D along the central axis of the hole. In another example, an operation task of the robot is to control the end effector to work within a workpiece and not exceed an edge of the workpiece. In this example, reference points of the forbidden region virtual fixture are constructed based on the geometric feature corresponding to the point cloud characterizing the workpiece, i.e., an edge of the workpiece, to control the end effector not to move exceed the edge of the workpiece, thereby avoiding damaging to the workpiece, or affecting other objects or operators outside the workpiece.

After the reference point and control point are selected, the virtual force of the virtual fixture acting on the control point may be determined based on the distance between the reference point and the control point. The virtual force is a force that the virtual fixture "acts" on the robot according to rules set by the human, and since the virtual fixture does not really exist, no actual contact force is exerted on the robot. Thus, the virtual force is embodied as a control force of the robot. When the distance between the reference point and the control point is greater than or equal to a preset value, the virtual force may be set to zero. When the distance between the reference point and the control point is less than the preset value, the virtual force increases as the distance between the reference point and the control point decreases. The magnitude of the virtual force may be adjusted according to the actual application scenario. It can be understood that the preset value may be set in advance. The distance between the reference point and the control point may be compared with the preset value in the first place. When the distance is greater than or equal to the preset value, computation of the virtual force is not performed. When the distance is less than the preset value, the magnitude of the virtual force is computed according to a preset manner. For example, in some embodiments, the virtual force may be determined according to following formulas.

$$\overrightarrow{F_i(d_i)} = C - k\overrightarrow{d_i},$$

When $\|\overrightarrow{d_i}\| > d_{ref}, \overrightarrow{F_i(d_i)} = 0,$

When $\|\overrightarrow{d_i}\| \le d_{ref}, \overrightarrow{F_{total}} = \sum_{i=0}^{n} \overrightarrow{F_i(d_i)}.$ Wherein, $\overrightarrow{d_i}$ denotes a distance vector from the control point to an $i^{th}$ reference point, C denotes an artificially set constant (representing a maximum value of the virtual force of a single reference point on the control point), k denotes a coefficient set based on experience and test results, $d_{ref}$ denotes a range within which the reference point may generate virtual force, $\overrightarrow{F_i(d_i)}$ denotes a virtual force vector of the $i^{th}$ reference point on the control point, n denotes the number of all reference points affecting the control point, and $\overrightarrow{F_{total}}$ denotes a resultant force vector of the virtual forces of all reference points on the control point.

Figure 4:
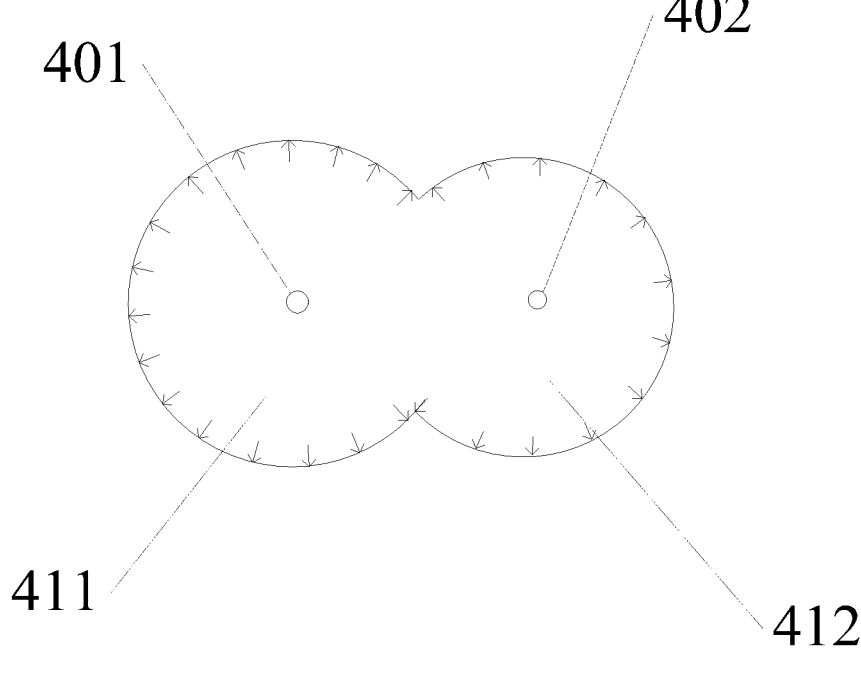
FIG. 4 illustrates a schematic diagram of a fused potential field of two reference points according to an embodiment of the present disclosure.
Figure 5:
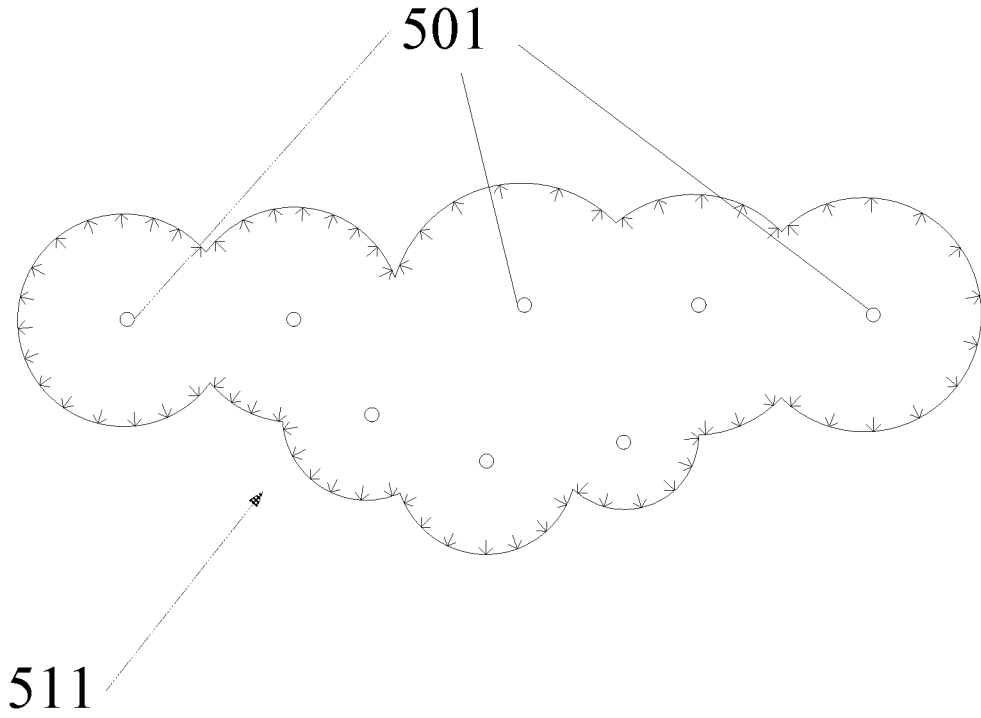
FIG. 5 illustrates a schematic diagram of a wall-shaped potential field of a plurality of reference points according to another embodiment of the present disclosure.

In some embodiments, a spherical potential field may be determined by using the reference point as a center of a sphere, and a radius of the spherical potential field is set to be greater than or equal to a half of a distance between centers of adjacent spherical potential fields. When the control point is located at or outside an edge of the spherical potential field, the virtual force is zero. Here, assuming that the radius of the spherical potential field is R, then C=k*R. Since the reference point is selected from points of the point cloud that characterizes a surface of the object, and the vision device generally performs scanning operations at a certain sampling frequency, a spacing of adjacent points of the point cloud may be considered to be substantially fixed. Referring to FIG. 4, two adjacent reference points, i.e., a first reference point 401 and a second reference point 402, are taken as an example for illustration. In this case, the first spherical potential field 411 and second spherical potential field 412, which are established based on the first reference point 401 and the second reference point 402 respectively, are fused to form a larger and partially overlapped potential field. Referring to FIG. 5, multiple reference points 501 are taken as an example for illustration, whose spherical potential fields are fused to form a continuous and wall-like potential field 511. In an example, when the virtual fixture is the forbidden region virtual fixture, the wall-like potential field 511 is configured to control the robot to prevent the control point from crossing the wall-like potential field 511 and from entering the forbidden region inside the wall-like potential field 511. When the virtual fixture is the guidance virtual fixture, the wall-like potential field is configured to control the robot to prevent the control point from crossing the wall-like potential field 511 and to constrain the control point to the guidance area within the wall potential field 511.

In another implementation, in order to make the virtual force of the reference point acting on the control point to be continuous in the space range, the magnitude of the virtual force generated by the forbidden region virtual fixture or the guidance virtual fixture on the control point may be determined according to the following methods.

1. Forbidden Region Virtual Fixture $$\overrightarrow{F_{rep,i}(d_i)} = \frac{2K_{FR}}{1 + e^{\gamma \cdot d_i}} \cdot \frac{\overrightarrow{X_{control}} - \overrightarrow{X_i}}{d_i}$$

$$\overrightarrow{F_{rep}} = \sum_{i=0}^{n} \overrightarrow{F_{rep,i}(d_i)}$$

Wherein, $K_{FR}$ denotes an artificially set constant (representing a maximum value of the virtual force of a single reference point acting on the control point); $\gamma$ denotes an artificially set coefficient, and a magnitude of $\gamma$ affects an action range of the virtual force of the reference point and a changing rate of the virtual force within this action range; $\overrightarrow{X_{control}}$ denotes a position of the control point, and $\overrightarrow{X_i}$ denotes a position of the reference point; $\overrightarrow{F_{rep,i}(d_i)}$ denotes a virtual repulsive force vector generated by an $i^{th}$ reference point on the control point; and $\overrightarrow{F_{rep}}$ denotes a resultant force vector of the virtual repulsive forces of all reference points on the control point.

In this way, the obtained virtual forces may be continuous in the space range without step change, thereby ensuring the control stability of the robot.

2. Guidance Virtual Fixture $$\overrightarrow{F_{att,i}(d_i)} = \begin{cases} \dfrac{2K_{FR}}{1 + e^{\gamma \cdot d_i}} \cdot \dfrac{\overrightarrow{X_i} - \overrightarrow{X_{control}}}{d_i} & d_i > r_s \\ 0 & d_i \le r_s \end{cases}$$

$$\overrightarrow{F_{att}} = \sum_{i=0}^{n} \overrightarrow{F_{att,i}(d_i)}$$

Wherein, $\overrightarrow{F_{att,i}(d_i)}$ denotes a virtual attractive force vector generated by an it h reference point acting on the control point; $\overrightarrow{F_{att}}$ denotes a resultant force vector of virtual attractive forces of all reference points acting on the control point. Definitions of other parameters may refer to the aforementioned description for the forbidden region virtual fixture.

It should be noted that, for determining the virtual force of the guidance virtual fixture, a parameter $r_s$ is introduced, which represents a small force vacuum range, which is centered on a single reference point and set artificially. Without the setting of the parameter $r_s$, the closer the control point is to the reference point, the greater the virtual attractive force is. In this case, the control point, that is very close to the reference point and should no more be guided towards the reference point, may be subjected to a maximum virtual attractive force, which may bring a great impact on the robot. Therefore, by introducing the parameter $r_s$, in response to the control point entering the force vacuum range corresponding to $r_s$, the reference point may no longer apply a virtual attractive force on the control point. In this case, the reference point may move freely within this range. In other words, in response to the control point reaching a desired position based on the guidance virtual fixture, the control point may be no longer subjected to the virtual guiding force of the guidance virtual fixture. In response to the control point being out of the force vacuum range for some reasons, the control point may be again subjected to the virtual guiding force of the virtual fixture. In this way, it is ensured that the control point can be guided to an action range of the guidance virtual fixture, while the robot system can be stable without being impacted.

Figure 6:
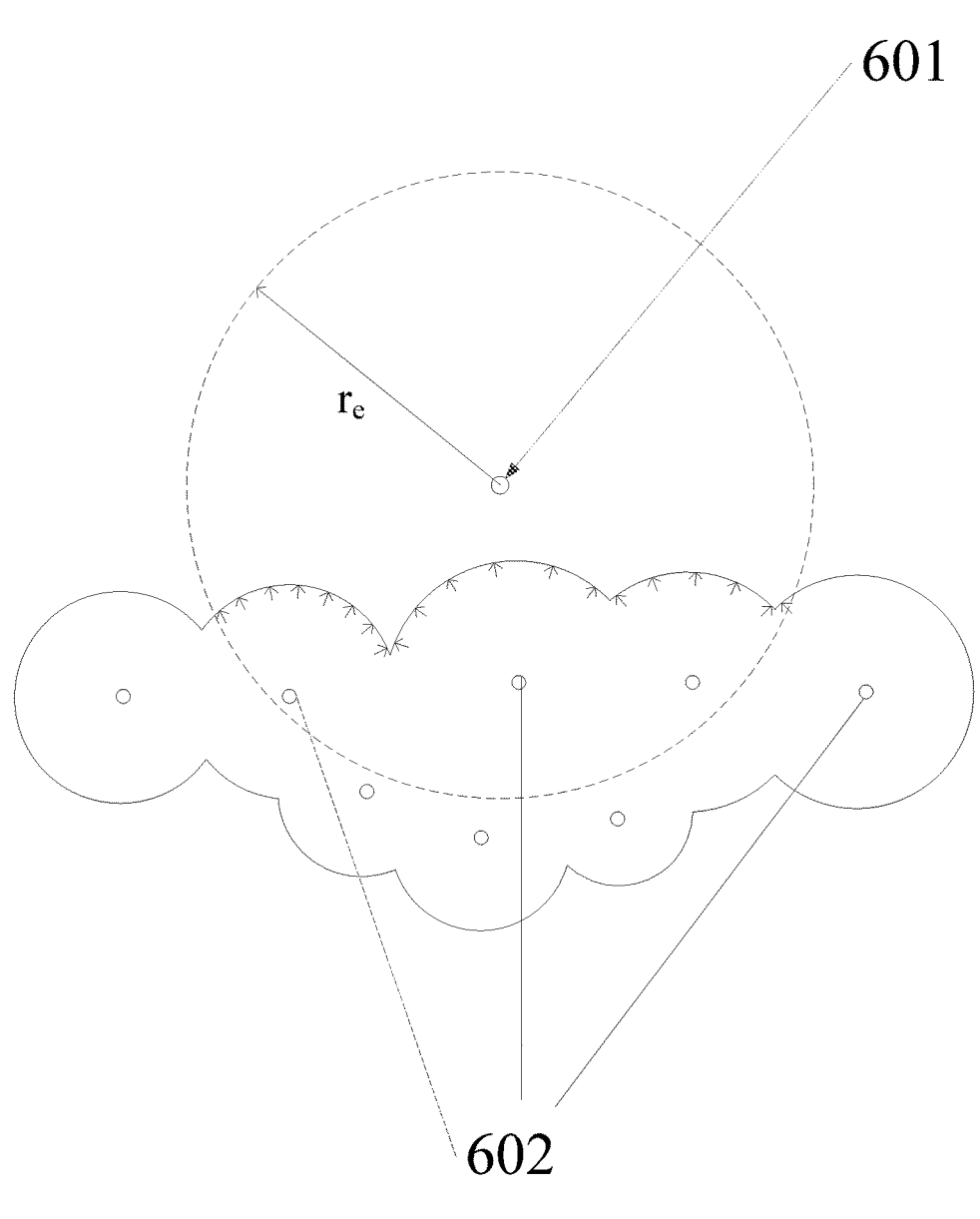
FIG. 6 illustrates an application scenario diagram showing at least one reference point being selected for computing a virtual force according to some embodiments of the present disclosure.
Figure 7:
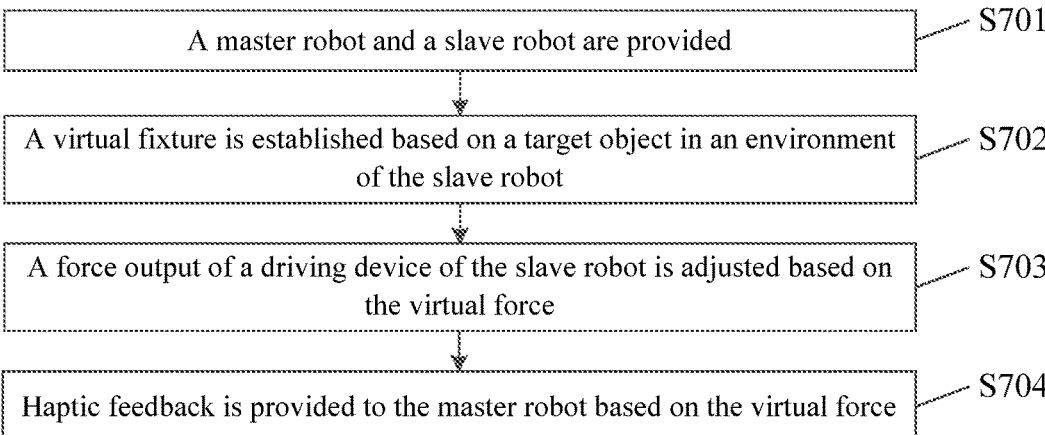
FIG. 7 is a schematic flowchart of a robot teleoperation method according to some embodiments of the present disclosure.
Figure 8:
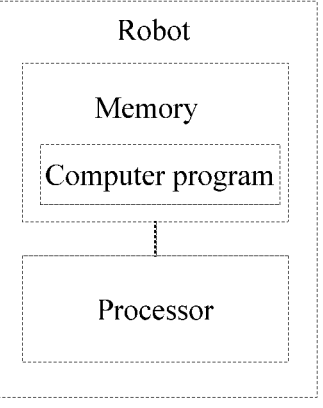
FIG. 8 is a schematic diagram of a robot according to some embodiments of the present disclosure.
Figure 9:
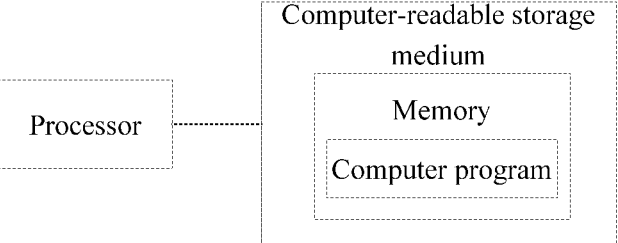
FIG. 9 is a schematic diagram of a computer readable storage medium according to some embodiments of the present disclosure.

In the above calculation methods for the virtual force of the forbidden region virtual fixture and the virtual force of the guidance virtual fixture, the virtual force is continuous in the space range (except for the force vacuum range), which is different from the other calculation method that uses $d_{ref}$ to judge whether the virtual force is 0. Moreover, during a process of controlling the robot, it may be possible to calculate virtual forces by using some of the multiple reference points. Referring to FIG. 6, a pre-evaluated range $r_e$ may be determined by taking a control point 601 as a center, to compare and determine whether each of reference points 602 in the point cloud falls within the pre-evaluated range $r_e$ (that is, performing a comparison on whether a distance between each respective reference point and the control point is less than $r_e$). The reference point(s) that is within in the pre-evaluated range may be selected to compute the virtual force according to the above methods, which is beneficial to saving computing resources.

In some embodiments, the pre-evaluated range $r_e$ may be determined as below:

$$r_e = r_0 + \|v_e\| \cdot k_v$$

Wherein, $r_0$ denotes a minimum value of an artificially set pre-evaluated range; $v_e$ denotes a current moving velocity of a control point, and $k_v$ denotes a coefficient set based on experiences and test results. In this way, the faster the current moving velocity of the control point, the larger the pre-evaluated range, so that more reference points may be included in the pre-evaluated range for computing the virtual force, thereby avoiding the case of failing to introduce appropriate number of reference points into the computation in time due to the high moving velocity of the robot. In addition, the lower the current moving velocity of the control point, the smaller the pre-evaluation range, in this case, a relative few number of reference points may be introduced for computation when the robot moves slowly, thereby saving computing resources.

At Step S104, the control force applied to the control point is determined based on the virtual force.

In some embodiments, in response to the virtual force being zero, the virtual fixture does not need to provide any additional force feedback, and the robot can output a given drive force to control the control point of the robot to move along the desired moving path or the desired obstacle avoidance path. In response to the virtual force being not zero, the virtual fixture provides additional force feedback, and the robot outputs a drive force based on a resultant force of the force feedback and a given control force, to overcome the virtual force and to move the control point along the desired moving path or the desired obstacle avoidance path.

In the example where the virtual fixture is a forbidden region virtual fixture, when the distance between the reference point and the control point is too small, the forbidden region virtual fixture generates a repulsive force, and accordingly, the robot is controlled to perform obstacle avoidance by applying a corresponding control force to the control point, to force the control point to move away from this region. In the example where the virtual fixture is a guidance virtual fixture, when the control point performs a drift motion near the reference point, the guidance virtual fixture generates a corresponding attractive force according to a deviation distance, and accordingly, a corresponding control force is applied to the control point, so that the control point is constrained within this region and moves along the desired trajectory line to the greatest extent.

When the virtual fixture is the forbidden region virtual fixture, the virtual force may be set as a repulsive force, and a direction of the repulsive force may be set away from the reference point. When the virtual fixture is the guidance virtual fixture, the virtual force may be set as an attractive force, and a direction of the attractive force may be set to be pointing to the reference point. In this way, the direction of the virtual force may be presented on a human-machine interface to provide direct visual feedback to an operator, thereby allowing the operator to control the robot and to move the control point along the desired obstacle avoidance path or the desired motion path.

In some embodiments, the virtual fixture may include a plurality of reference points, in this case, the virtual force may be set as a resultant virtual force generated by the plurality of reference points on the control point. In an example, when an obstacle with a certain volume is disposed in the motion trajectory of the control point of the robot, the virtual fixture is established based on the point cloud of the surface of the obstacle, and the established virtual fixture may include a plurality of reference points. In this case, it is desired to compute a resultant force of the virtual forces (i.e., the resultant virtual force) generated by the plurality of reference points on the control point in real time, and to determine a control force applied to the control point based on the resultant virtual force, so as to drive the control point to deorbit to avoid the obstacle, and to approach the target position after avoiding the obstacle.

In some embodiments, the robot may include a plurality of control points, in this case, the virtual force may be set as a resultant virtual force generated by the reference points on each of the plurality of control points. In an example, the end effector of the robot may be of irregular shape, and the robot may be set to include a plurality of control points. When a point-like obstacle is disposed in the motion trajectory of the end-effector of the robot, the virtual fixture is established based on the point cloud of the surface of the obstacle, and the established virtual fixture may include a reference point. In this case, it is desired to compute a resultant force of virtual forces (i.e., the resultant virtual force) generated by the reference point on each of the plurality of control point in real time, and to determine a control force applied to each of the plurality of control points based on the resultant virtual force, so as to drive the control point to deorbit to avoid the obstacle, and to approach the target position after avoiding the obstacle.

In some embodiments, before the virtual force of the virtual fixture acting on the control point is determined, considering that the control point moves along a given trajectory within the working environment, a predetermined range including all control points and moving with the robot is determined. The reference points whose action range of the virtual force enters the predetermined range are determined, and eventually a control force applied to a certain control point within the predetermined range is determined based on the virtual force of the reference points acting on the certain control point within the predetermined range. In other words, in response to the predetermined range entering the action range of the virtual force of a certain reference point(s), the control force applied to the control point is determined based on the virtual force of the certain reference point(s) acting on the control point within the predetermined range. In response to the action range of the virtual force of a certain reference point(s) being outside the predetermined range, no calculation is performed for the virtual force of the certain reference point(s) acting on the control point within the predetermined range. Here, the predetermined range may be a rectangular range, an ellipsoidal range, or a spherical range, etc. The predetermined range may include one or more control points. In an example, the spherical range may include three control points and the spherical range moves along with the movement of the control points. An obstacle with a certain volume is disposed in a motion trajectory of the control points, and the virtual fixture established based on the point cloud of the surface of the obstacle includes 100 reference points. During the movement of the spherical range, the spherical range may enter action ranges of the virtual forces corresponding to 10 reference points at a time, then the resultant virtual force of the 10 reference points acting on the 3 control points is calculated. In addition, there are still 90 reference points each having an action range of the virtual force outside the spherical range at this time, then the resultant virtual force of the 90 reference points acting on the 3 control points in the spherical range is not calculated. That is, only the reference points within a specific range are activated for the calculation of the virtual forces, while the reference points outside the specific range are not taken into account for calculation, since they are so far away from the control points that no force interaction is generated between the reference points outside the specific range and the control points, which is beneficial to reducing the number of virtual forces that need to be calculated simultaneously.

The spherical range may be set according to practical application scenarios. In some embodiments, a radius of the spherical range may be adjusted according to a moving speed of the robot. The faster the robot moves, the larger the radius of the spherical range is. In some embodiments, the radius of the spherical range is a product of a moving speed of the spherical range and a loop interval for adjusting the radius of the spherical range. In this way, it is ensured that before the next computing program cycle starts, the control point in the working environment would not move along a given path to a location where the reference points are not activated. Based on this, in the present disclosure, the number of virtual forces that need to be calculated simultaneously can be significantly reduced, thereby reducing the computation load, increasing the computation frequency, and providing better operating performance and security performance.

The methods of the above embodiments may be applied to a controller of a robot, to operate an end effector of the robot to perform tasks safely and efficiently in a complex and changing working environment.

The methods of the above embodiments may also be applied to a teleoperation robot that is capable to provide tactile feedback. When a long-distance operation is performed by using the robot teleoperation, a master robot may send a control instruction from an operator, transfer the control instruction to a slave robot via communication, to cause the slave robot to execute the control instruction in the environment. Relevant information from the slave robot and the working environment may be fed back to the operator, so that the operator can have an immersive feeling, for effectively accomplishing the operation task. In some embodiments, the robot teleoperation method further comprises the following steps S701 to S704.

At Step S701, the master robot and the slave robot are provided.

At Step S702, the virtual fixture is established based on the target object in the environment of the slave robot.

At Step S703, a force output of a driving device of the slave robot is adjusted based on the virtual force.

At Step S704, haptic feedback is provided to the master robot based on the virtual force.

In an exemplary robot teleoperation process, an operation task of the robot is that the operator controls a movement of a robot arm of the slave robot via a controller of the master robot, to enable the robot arm to move from an initial position A to a target position B. In the case that an obstacle being disposed in a moving trajectory of the robot, a forbidden region virtual fixture is established based on a geometric feature of a point cloud of the obstacle, and a reference point is determined. In response to a control point of the robot arm entering an action range of a virtual force of the reference point, the forbidden region virtual fixture generates a virtual force acting on the control point. On one hand, based on such virtual force, the controller of the slave robot may determine a control force applied to the control point, to adjust a travel trajectory of the control point in time by adjusting the force output of the driving device of the slave robot. That is, since the slave robot interacts with the working environment, the slave robot may adjust the control force of the control point in the real working environment in time based on the virtual force, thereby avoiding the influence of the communication delay on the movement of the slave robot, and improving the security performance of the movement of the slave robot. On the other hand, in response to the forbidden region virtual fixture generating a virtual force acting on the control point, the tactile feedback may be provided to the master robot based on the virtual force, so as to improve the performance of immersive experience of the operator, and to assist the operator to control the robot arm in the working environment to perform dynamic obstacle avoidance or path guidance, thereby improving the operating performance of the master robot.

Some embodiments of the present disclosure further provide a robot, including a memory and a processor. The memory is configured to store a computer program. The processor is configured to perform the method of any of the above-mentioned embodiments when the processor executes the computer program. The memory and processor may be connected via a bus or other ways. In an example, the processor may perform the following steps S101 to S104.

At Step S101, an image of a target object is acquired and a point cloud of the target object is generated based on the image.

At Step S102, a virtual fixture is established based on a geometric feature corresponding to the point cloud; the virtual fixture includes at least one of a forbidden region virtual fixture or a guidance virtual fixture.

At Step S103, a reference point of the virtual fixture and a control point of the robot are determined, and a virtual force of the virtual fixture acting on the control point is determined according to a distance between the reference point and the control point.

At Step S104, a control force applied to the control point is determined based on the virtual force.

Some embodiments of the present application further provide a computer-readable storage medium storing a computer program. When the computer program is executed by a processor, the processor is caused to perform the method of any of the above-mentioned embodiments. In an example, the computer program may cause the processor to perform the following steps S101 to S104.

At Step S101, an image of a target object is acquired and a point cloud of the target object is generated based on the image.

At Step S102, a virtual fixture is established based on a geometric feature corresponding to the point cloud; the virtual fixture includes at least one of a forbidden region virtual fixture or a guidance virtual fixture.

At Step S103, a reference point of the virtual fixture and a control point of the robot are determined, and a virtual force of the virtual fixture acting on the control point is determined according to a distance between the reference point and the control point.

At Step S104, a control force applied to the control point is determined based on the virtual force.

For other implementation details of the robot and the computer-readable storage medium according to some embodiments of the present disclosure, reference may be made to the relevant description of the foregoing embodiments of the robot teleoperation method, which will not be repeated herein.

To sum up, in the robot teleoperation method, the robot and the computer-readable storage medium according to the embodiments of the present disclosure, the image of the target object can be acquired in real time, the point cloud of the target object can be generated according to the image, and the virtual fixture of the robot can be established based on the geometric feature corresponding to the point cloud, so as to realize timely adaptation to the changing or unstructured environment, thereby overcoming the technical defect that the conventional pre-defined virtual fixture may only be applied to the pre-constructed and fixed working environment. In addition, in the embodiments of the present disclosure, the virtual fixture established in real time is capable to handle and adapt to the environment with irregular or constantly changing geometric shapes, thereby overcoming the technical limitation that the conventional virtual fixture may only be constructed to have a fixed shape.

Those of ordinary skill in the art can understand that all or part of the process in the method of the above-mentioned embodiments can be implemented by instructing a relevant hardware through a computer program, and the computer program can be stored in a non-transitory computer-readable storage medium. When the computer program is executed, the processes of the embodiments of the above-mentioned methods may be implemented. Any reference to memory, storage, database or other media used in the various embodiments provided in this disclosure may include at least one of non-transitory or transitory memory. The non-transitory memory may include a read-only memory (ROM), a magnetic tape, a floppy disk, a flash memory, an optical memory, or the like. The transitory memory may include a random access memory (RAM) or an external cache memory. By way of illustration and not limitation, the RAM may be in various forms, such as a static random access memory (SRAM) or a dynamic random access memory (DRAM).

The above-mentioned embodiments merely illustrate several exemplary implantations of the present disclosure, and the descriptions thereof are specific and detailed, but shall not be construed as a limitation to the scope of the disclosure. It should be pointed out that for those skilled in the art, some modifications and improvements may be made without departing from the concept of the present disclosure, which shall all fall within the protection scope of the present disclosure. Therefore, the protection scope of the disclosure shall be subject to the appended claims.

What is claimed is:

1. A teleoperation method for a robot, the teleoperation method comprising:

acquiring an image of a target object, and generating a point cloud of the target object according to the image;

establishing a virtual fixture based on a geometric feature corresponding to the point cloud; the virtual fixture comprising at least one of a forbidden region virtual fixture or a guidance virtual fixture;

determining a reference point of the virtual fixture and a control point of the robot, and determining a virtual force of the virtual fixture acting on the control point according to a distance between the reference point and the control point; and determining a control force applied to the control point based on the virtual force, wherein determining the virtual force of the virtual fixture acting on the control point according to the distance between the reference point and the control point comprises:

in response to the distance being greater than or equal to a preset value, setting the virtual force to be zero; and in response to the distance being less than the preset value, setting the virtual force in such a manner that the less the distance between the reference point and the control point, the greater the virtual force;

the method further comprises:

in response to the virtual fixture being the guidance virtual fixture, setting a force vacuum range with the reference point as a center of the force vacuum range;

in response to the distance being less than the preset value and the control point being outside the force vacuum range, setting the virtual force in such a manner that the smaller the distance between the reference point and the control point, the greater the virtual force; and in response to the control point being within the force vacuum range, setting the virtual force to be zero.

2. The teleoperation method according to claim 1, further comprising:

determining a spherical potential field with the reference point as a center of the spherical potential field, and a radius of the spherical potential field being greater than or equal to a half of a distance between centers of two adjacent spherical potential fields;

wherein the virtual force is zero in response to the control point being located outside an edge of the spherical potential field.

3. The teleoperation method according to claim 1, wherein the reference point is selected from points of the point cloud characterizing a surface of the target object.

4. The teleoperation method according to claim 1, wherein the control point is selected from a group consisting of points of a surface of an end effector of the robot and points of a surface of a robot arm of the robot.

5. The teleoperation method according to claim 1, wherein the reference point comprises a plurality of reference points;

wherein the method further comprises:

constructing the plurality of reference points based on the geometric feature, wherein distribution of the plurality of reference points corresponds to a desired motion path or a desired obstacle avoidance path of the control point.

6. The teleoperation method according to claim 5, wherein the geometric feature comprises at least one of a central axis of a cylinder, a surface of a table, an edge of a workpiece, or a center of a sphere.

7. The teleoperation method according to claim 1, further comprising:

in response to the virtual fixture being the forbidden region virtual fixture, setting the virtual force to be a repulsive force, and setting a direction of the repulsive force to be pointing away from the reference point; and in response to the virtual fixture being the guiding virtual fixture, setting the virtual force to be an attractive force, and setting a direction of the attractive force to be pointing to the reference point.

8. The teleoperation method according to claim 1, wherein the acquiring the image of the target object comprises:

using a visual device to acquire image data and/or depth data of the target object in real time at a preset sampling frequency;

wherein the visual device is installed on an end effector of the robot or a fixed device relative to the target object.

9. The teleoperation method according to claim 1, wherein the reference point comprises a plurality of reference points, wherein the method further comprises: in response to the virtual fixture comprising the plurality of reference points, setting the virtual force to be a resultant virtual force of the plurality of reference points acting on the control point.

10. The teleoperation method according to claim 1, wherein the reference point comprises a plurality of reference points, wherein the method further comprises: in response to the virtual fixture being the forbidden region virtual fixture, determining the virtual force according to following formulas:

$$\overrightarrow{F_{rep,i}(d_i)} = \frac{2K_{FR}}{1 + e^{\gamma \cdot d_i}} \cdot \frac{\overrightarrow{X_{control}} - \overrightarrow{X_i}}{d_i}$$

$$\overrightarrow{F_{rep}} = \sum_{i=0}^{n} \overrightarrow{F_{rep,i}(d_i)}$$

wherein $\overrightarrow{F_{rep,i}(d_i)}$ denotes a virtual repulsive force vector generated by an $i^{th}$ reference point on the control point;

$\overrightarrow{F_{rep}}$ denotes a resultant force vector of the virtual repulsive forces of all reference points on the control point;

$K_{FR}$ denotes an artificially set constant and represents a maximum value of the virtual force of a single reference point acting on the control point;

$\gamma$ denotes an artificially set coefficient, and a magnitude of $\gamma$ affects an action range of the virtual force of the reference point and a changing rate of the virtual force within this action range;

$\overrightarrow{X_{control}}$ denotes a position of the control point;

$\overrightarrow{X_i}$ denotes a position of the $i^{th}$ reference point; and $\overrightarrow{d_i}$ denotes a distance vector from the control point to the $i^{th}$ reference point.

11. The teleoperation method according to claim 1, wherein the reference point comprises a plurality of reference points, wherein the method further comprises: in response to the virtual fixture being a guidance virtual fixture, determining the virtual force according to following formulas:

$$\overrightarrow{F_{att,i}(d_i)} = \begin{cases} \dfrac{2K_{FR}}{1 + e^{\gamma \cdot d_i}} \cdot \dfrac{\overrightarrow{X_i} - \overrightarrow{X_{control}}}{d_i} & d_i > r_s \\ 0 & d_i \le r_s \end{cases}$$

$$\overrightarrow{F_{rep}} = \sum_{i=0}^{n} \overrightarrow{F_{rep,i}(d_i)}$$

wherein $\overrightarrow{F_{att,i}(d_i)}$ denotes a virtual attractive force vector generated by an $i^{th}$ reference point acting on the control point;

$\overrightarrow{F_{att}}$ denotes a resultant force vector of virtual attractive forces of all reference points acting on the control point;

$K_{FR}$ denotes an artificially set constant and represents a maximum value of the virtual force of a single reference point acting on the control point;

$\gamma$ denotes an artificially set coefficient, and a magnitude of $\gamma$ affects an action range of the virtual force of the reference point and a changing rate of the virtual force within this action range;

$\overrightarrow{X_i}$ denotes a position of the $i^{th}$ reference point;

$\overrightarrow{X_{control}}$ denotes a position of the control point;

$r_s$ denotes a radius of the force vacuum range; and $\overrightarrow{d_i}$ denotes a distance vector from the control point to the $i^{th}$ reference point.

12. The teleoperation method according to claim 1, wherein the control point comprises a plurality of control points, wherein the method further comprises: in response to the robot comprising the plurality of control points, setting the virtual force to be a resultant virtual force of the reference point acting on each of the plurality of control points.

13. The teleoperation method according to claim 1, wherein the reference point comprises a plurality of reference points, and the control point comprises a plurality of control points, wherein the method further comprises: before the determining the virtual force of the virtual fixture acting on the control point according to the distance between the reference point and the control point, determining a preset range comprising all the plurality of control points and moving along with the robot;

in response to the preset range entering an action range of a virtual force of a certain reference point of the plurality of reference points, determining the control force applied to the control point based on the virtual force of the certain reference point acting on the control point within the preset range; and in response to the action range of the virtual force of a certain reference point of the plurality of reference points being outside the preset range, not calculating the virtual force of the certain reference point acting on the control point within the spherical range.

14. The teleoperation method according to claim 13, wherein the preset range is a spherical range, and the method further comprises: adjusting a radius of the spherical range according to a moving speed of the robot, wherein the larger the moving speed of the robot, the greater the radius of the spherical range.

15. The teleoperation method according to claim 14, wherein the radius of the spherical range is a product of the moving speed of the spherical range and a loop interval for adjusting the radius of the spherical range.

16. The teleoperation method according to claim 1, further comprising:

providing a master robot and a slave robot;

establishing the virtual fixture based on the target object in an environment of the slave robot;

adjusting a force output of a driving device of the slave robot based on the virtual force; and providing haptic feedback to the master robot based on the virtual force.

17. A robot, comprising:

a memory; and a processor, wherein the memory is configured to store a computer program, and the processor is configured to perform a teleoperation method for the robot when the processor executes the computer program, the method comprising:

acquiring an image of a target object, and generating a point cloud of the target object according to the image;

establishing a virtual fixture based on a geometric feature corresponding to the point cloud; the virtual fixture comprising at least one of a forbidden region virtual fixture or a guidance virtual fixture;

determining a reference point of the virtual fixture and a control point of the robot, and determining a virtual force of the virtual fixture acting on the control point according to a distance between the reference point and the control point; and determining a control force applied to the control point based on the virtual force, wherein determining the virtual force of the virtual fixture acting on the control point according to the distance between the reference point and the control point comprises:

in response to the distance being greater than or equal to a preset value, setting the virtual force to be zero; and in response to the distance being less than the preset value, setting the virtual force in such a manner that the less the distance between the reference point and the control point, the greater the virtual force;

the method further comprises:

in response to the virtual fixture being the guidance virtual fixture, setting a force vacuum range with the reference point as a center of the force vacuum range;

in response to the distance being less than the preset value and the control point being outside the force vacuum range, setting the virtual force in such a manner that the smaller the distance between the reference point and the control point, the greater the virtual force; and in response to the control point being within the force vacuum range, setting the virtual force to be zero.

18. A non-transitory computer-readable storage medium, storing a computer program thereon, wherein, when the computer program is executed by a processor, the processor is caused to perform a teleoperation method for a robot, the teleoperation method comprising:

acquiring an image of a target object, and generating a point cloud of the target object according to the image;

establishing a virtual fixture based on a geometric feature corresponding to the point cloud; the virtual fixture comprising at least one of a forbidden region virtual fixture or a guidance virtual fixture;

determining a reference point of the virtual fixture and a control point of a robot, and determining a virtual force of the virtual fixture acting on the control point according to a distance between the reference point and the control point; and determining a control force applied to the control point based on the virtual force, wherein determining the virtual force of the virtual fixture acting on the control point according to the distance between the reference point and the control point comprises:

in response to the distance being greater than or equal to a preset value, setting the virtual force to be zero; and in response to the distance being less than the preset value, setting the virtual force in such a manner that the less the distance between the reference point and the control point, the greater the virtual force;

the method further comprises:

in response to the virtual fixture being the guidance virtual fixture, setting a force vacuum range with the reference point as a center of the force vacuum range;

in response to the distance being less than the preset value and the control point being outside the force vacuum range, setting the virtual force in such a manner that the smaller the distance between the reference point and the control point, the greater the virtual force; and in response to the control point being within the force vacuum range, setting the virtual force to be zero.

* * * * *